Sept. 25, 1923.  
R. L. STAUNTON  
LEAD JOINT RUNNER  
Filed Oct. 31, 1922  
1,469,027
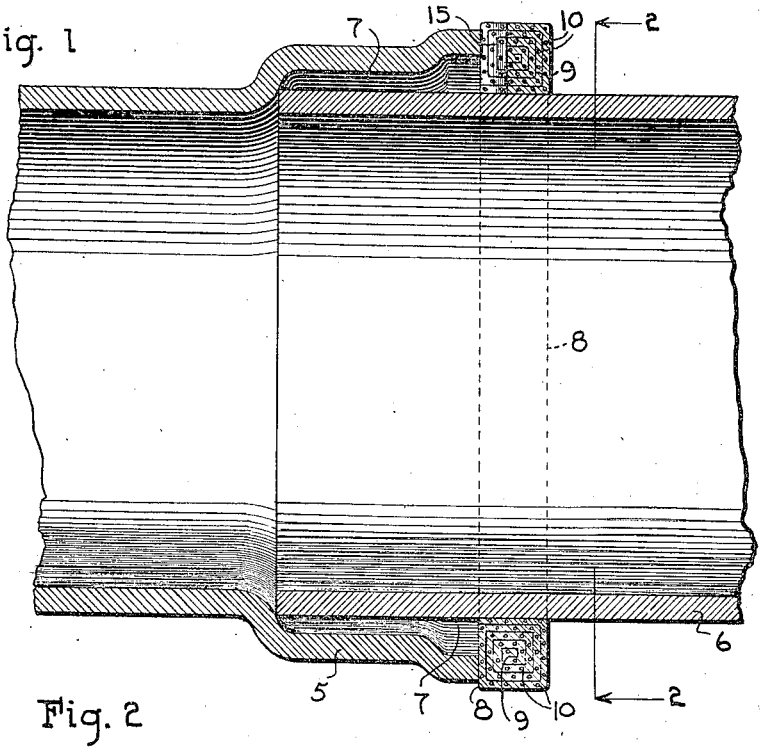
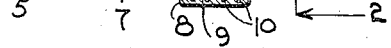
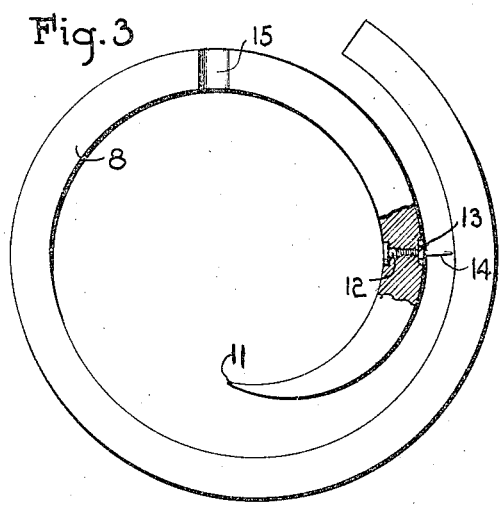
R. L. Staunton INVENTOR
WITNESSES
BY
ATTORNEY Patented Sept. 25, 1923.

1,469,027

UNITED STATES PATENT OFFICE.

ROBERT L. STAUNTON, OF SALINA, KANSAS.

LEAD-JOINT RUNNER.

Application filed October 31, 1922. Serial No. 598,228.

*To all whom it may concern:*

Be it known that I, ROBERT L. STAUNTON, a citizen of the United States, residing at Salina, in the county of Saline and State of Kansas, have invented a new and useful Improvement in Lead-Joint Runners, of which the following is a specification.

My invention relates to an improved lead joint runner such as is used in pouring lead to calk a bell and spigot joint.

The objects of this invention are: to provide a runner which is adapted to be applied to any size or shape of pipe most commonly used; to provide one which entirely does away with clamps, locks, dams, etc., one absolutely leak-proof; and further, to provide a runner which will retain its original shape after continued use, one that is easy and almost instantaneous in application.

The invention is illustrated in the accompanying drawing, in which,

Fig. 1 is a vertical longitudinal section through a bell and spigot joint having my runner applied thereto.

Fig. 2 is a transverse vertical section on the line 2—2 of Fig. 1.

Fig. 3 is a side elevation of my improved runner with a portion shown in section.

In the drawing, the numeral 5 indicates the bell end, and the numeral 6 the spigot end of a pipe joint to which my improved runner is applied, in order to form a dam to hold the molten lead which is poured into the space 7 between the two ends.

The runner which is indicated as a whole by the numeral 8, is preferably formed from a strip of woven asbestos cloth, which is rolled as shown at 9, to form a continuous rope or band, and is vulcanized so that its cross section is substantially in the shape of a square, as illustrated. The threads of the asbestos fabric are preferably reinforced by fine wires 10 of copper or other suitable material.

One end of the rope or band is beveled so as to form a comparatively long wedge having a feather edge 11. In a suitable portion of the rope, not far from the edge 11, a screw 12 is inserted through the rope or band, as shown in Fig. 3, and a nut is threaded to its outer end, the head of the screw and the nut being countersunk in the surface of the rope. The screw is preferably made of tool steel, and the end which projects through the rope or band is formed into a smooth sharp point 14, which will readily pierce the outer ply of the rope when it is wound over it. A groove 15 is formed in one edge of the rope or band through which the molten lead may be poured.

In applying the runner, it is first laid on the pipe with the groove 15 at the upper side adjacent the bell end. The feather end is then laid closely against the joint, and the other end of the rope is then drawn tightly and securely around the feather end and over the point 14, the latter piercing the runner. It will be obvious that the entire operation of placing the runner in position will occupy only a few seconds, and that a single runner may be used for pipe of practically any size. The shape in which the runner is vulcanized permits it to be placed snugly against the bell end, and after the lead is cast, no finishing will be necessary except to chip off the teat which will be left in the groove 15.

Among the advantages of this invention may be stated the following:—

A square face is formed on the face of the lead at the outer end of the space 7 following each pour, and as a result calking of the joint can be started immediately. The runner avoids the risk of making a defective pour, and leaves only a small teat of lead to be knocked off with a hammer, while in other devices a surplus of metal must be chiseled off, which takes time. The runner is absolutely leak-proof, this being due to the manner in which one part of the rope or band overlaps the other. The rope or band being built square, will always keep its natural shape, while other devices become round in a very short time after they are used. The pouring hole is so arranged on the rope or band that it accommodates all sizes of pipe most commonly used.

It will be understood, of course, that the invention is not limited to the precise embodiment shown herein, and that changes may be made in the size, shape or material without departing from the scope of the invention as claimed.

What is claimed is:—

1. A lead joint runner comprising a continuous rope or band having a metal point embedded in the rope or band at an intermediate point of its length, said point being adapted to pierce and hold overlapping portions of the rope or band after the latter has been wound around the pipe.

2. A lead joint runner comprising a rope composed of rolled asbestos fabric having one end tapered in the form of a wedge, and a metal point having its base embedded in the rope and its tip projecting outwardly and adapted to pierce and hold another portion of the rope after it has been wound around the pipe.

3. A lead joint runner comprising a rope having one end in the form of a wedge and a metal point having its base embedded in the rope and its tip projecting outwardly and adapted to pierce and hold another portion of the rope after it has been wound around the pipe, said rope having a transverse groove through which the molten lead may be poured.

4. A lead joint runner comprising a rope composed of rolled asbestos fabric vulcanized so as to be substantially square in cross section and having one end tapered in the form of a wedge, and a metal point having its base embedded in the rope and its tip projecting outwardly and adapted to pierce and hold another portion of the rope after it has been wound around the pipe, said rope having a transverse groove through which the molten metal may be poured.

5. A lead joint runner comprising a band adapted to be wound about a pipe adjacent a joint and composed of asbestos fabric in the form of a roll, the successive layers of the roll being vulcanized together and shaped so as to have flat contacting faces.

6. A lead joint runner comprising a band adapted to be wound about a pipe adjacent a joint and composed of asbestos fabric in the form of a roll, the successive layers of the roll being vulcanized together and shaped so as to be substantially square in cross section, the threads of the fabric being reinforced by fine metallic wire embedded therein.

7. A lead joint runner comprising a band adapted to be wound about the pipe adjacent a joint in overlapping relation, one end of the band being tapered to form an elongated wedge, said band being composed of asbestos fabric in the form of a roll, the successive layers of the roll being vulcanized together and shaped so as to be substantially square in cross section.

8. A lead joint runner comprising a band composed of successive layers of asbestos fabric in the form of an elongated roll having one end wedge-shaped whereby the remaining portion of the band may be wrapped about the same to fit a pipe of any size, and a spike extending from the band near the wedge end and adapted to pierce and hold the remaining portion after it has been wrapped around the pipe.

In testimony that I claim the foregoing as my own, I have hereto affixed my signature.

ROBERT L. STAUNTON.